United States Patent
Zhang et al.

(10) Patent No.: US 10,486,973 B2
(45) Date of Patent: Nov. 26, 2019

(54) SILICA-BASED SPHERICAL PARTICULATES AND METHODS OF PREPARING THE SAME

(71) Applicant: PPG Industries Ohio, Inc., Cleveland, OH (US)

(72) Inventors: Xiaofeng Zhang, Gibsonia, PA (US); Raphael O. Kollah, Wexford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 15/802,511

(22) Filed: Nov. 3, 2017

(65) Prior Publication Data

US 2018/0141820 A1    May 24, 2018

Related U.S. Application Data

(60) Provisional application No. 62/423,887, filed on Nov. 18, 2016.

(51) Int. Cl.
| | | |
|---|---|---|
| *C01B 33/12* | (2006.01) | |
| *C01B 33/193* | (2006.01) | |
| *C09C 1/30* | (2006.01) | |
| *C01B 33/18* | (2006.01) | |

(52) U.S. Cl.
CPC ............ *C01B 33/128* (2013.01); *C01B 33/18* (2013.01); *C01B 33/193* (2013.01); *C09C 1/3018* (2013.01); *C09C 1/3027* (2013.01); *C01P 2004/32* (2013.01); *C01P 2004/51* (2013.01); *C01P 2004/60* (2013.01); *C01P 2006/11* (2013.01); *C01P 2006/12* (2013.01); *C01P 2006/19* (2013.01); *C01P 2006/20* (2013.01)

(58) Field of Classification Search
CPC ..... C01B 33/128; C01B 33/18; C01B 33/193; C09C 1/3018; C09C 1/3027
See application file for complete search history.

(56) References Cited

U.S. PATENT DOCUMENTS

| | | | |
|---|---|---|---|
| 4,681,750 | A | 7/1987 | Johnson et al. |
| 5,104,221 | A | 4/1992 | Bolt et al. |
| 5,922,298 | A | 7/1999 | Boyer et al. |
| 6,107,226 | A | 8/2000 | Chevallier |
| 7,253,224 | B2 | 8/2007 | Mohnot et al. |
| 8,846,806 | B2 | 9/2014 | Martin et al. |
| 9,073,041 | B2 | 7/2015 | Guo et al. |
| 2003/0219369 | A1* | 11/2003 | Raman ............ B01J 20/103 423/335 |
| 2010/0292386 | A1* | 11/2010 | Okel ............ B60C 1/00 524/492 |
| 2011/0206746 | A1 | 8/2011 | Hagar et al. |
| 2016/0249642 | A1 | 9/2016 | Rabe et al. |

FOREIGN PATENT DOCUMENTS

EP    0396450 A1    11/1990

\* cited by examiner

*Primary Examiner* — Melvin C. Mayes
*Assistant Examiner* — Michael Forrest
(74) *Attorney, Agent, or Firm* — The Webb Law Firm

(57) ABSTRACT

Spherically-shaped silica can include a precipitated silica powder having a $d_{50}$ particle size selected within a range of greater than 20 μm and up to 80 μm, a di-octyl adipate oil absorption selected within a range of from 150 ml/100 g to 500 ml/100 g, an average circularity selected within a range of from 0.70 to 1.0, and an angle of repose, of less than 30°. A process of preparing spherically-shaped silica powder is also included.

28 Claims, 2 Drawing Sheets

SILICA-BASED SPHERICAL PARTICULATES AND METHODS OF PREPARING THE SAME

CROSS REFERENCE TO RELATED APPLICATIONS

This application claims priority to U.S. Provisional Application No. 62/423,887, filed Nov. 18, 2016, the disclosure of which is hereby incorporated in its entirety by reference.

BACKGROUND OF THE INVENTION

Field of the Invention

The present invention relates to silica-based spherical particulates and methods of preparing the silica-based spherical particulates.

Description of Related Art

Silica, such as precipitated silica, is used in a variety of applications. For example, silica is commonly used as reinforcing fillers in polymeric materials, in a porous membrane (e.g., battery separator) to provide wettability and porosity, and as an additive in coatings and adhesives to modify appearance, rheology, and durability. Silica has also been used as a flow aid, material support, absorbent, and carrier. It is appreciated that the physical properties and surface chemistry of silica influence the different end-use applications of that silica. It is, therefore, desirable to provide a silica with a unique structure having improved properties that will expand the various applications the silica can be applied.

SUMMARY OF THE INVENTION

The present invention is directed to spherically-shaped silica. The spherically-shaped silica is a precipitated silica powder that comprises: a $d_{50}$ particle size selected within a range of greater than 20 μm and up to 80 μm; a di-octyl adipate oil absorption (DOA) selected within a range of from 150 ml/100 g to 500 ml/100 g; an average circularity selected within a range of from 0.70 to 1.0; and an angle of repose of less than 30°. In some examples, the spherically-shaped silica has an average circularity selected within a range of from 0.70 to 0.95.

The spherically-shaped silica can also have an average tamped density of greater than 150 g/l, or greater than 250 g/l. The spherically-shaped precipitated silica can further have a BET surface area of 80 to 600 m²/g, a CTAB surface area of 80 to 500 m²/g, a $d_{10}$ particle size selected within a range of greater than 3 μm and up to 40 μm, a $d_{90}$ particle size selected within a range of greater than 40 μm and up to 90 μm, and a bulk density selected within a range of at least 5 lb/ft³ and up to 30 lb/ft³. Moreover, at least 90 weight % of a sample of the spherically-shaped silica can pass through a 200-mesh sieve.

The spherically-shaped precipitated silica can be used to prepare various types of compositions. For example, the precipitated silica can be used to prepare a rubber composition such as for a tire, a coating composition, a porous polymer membrane composition, and/or a carrier or adsorbent composition.

The present invention is also directed to a process of preparing spherically-shaped precipitated silica powder. The process includes: (a) preparing a first alkali metal silicate aqueous solution; (b) preparing a second alkali metal silicate aqueous solution having a pH of greater than 7 with the first alkali metal silica aqueous solution and water; (c) simultaneously adding the first alkali metal silicate aqueous solution and an acidifying agent to the second aqueous alkali metal silicate aqueous solution to form a silica suspension comprising precipitated silica; (d) aging the silica suspension at a pH within a range of from 7 to 14; and (e) washing and drying the precipitated silica. The total time for steps (c) and (d) is less than 150 minutes. The process can also include adding an additional acidifying agent after the aging such that the pH of the suspension is less than 7. The precipitated silica can be dried by dispersing the silica in an aqueous medium and then spray drying the dispersed silica. In the drying step, the precipitated silica can be dispersed in the aqueous medium to form a solution with a solids content of less than 20%. In addition, at least one of steps (a) through d) can be performed at a temperature selected within a range of from 100° F. to 220° F.

Moreover, the first alkali metal silicate aqueous solution and the acidifying agent can be simultaneously added in step (c) over a time period within a range from 2 to 90 minutes. The silica suspension can also be aged in step (d) for a period of time selected within a range from 1 to 120 minutes.

Further, at least one of the first and second alkali metal silicate aqueous solutions can be represented by $x(SiO_2) \cdot Na_2O$, wherein x is a value selected within a range of from 1 to 4. The first alkali metal silicate aqueous solution used in the process of the present invention can have a concentration of less than 85 g/L $Na_2O$. The second alkali metal silicate aqueous solution can have an alkalinity AZ value selected within a range of from 1 to 40. In some examples, the alkalinity AZ value of the second alkali metal silicate aqueous solution decreases during the simultaneous addition step (c). Alternatively, the alkalinity AZ value of the second alkali metal silicate aqueous solution is maintained the simultaneous addition step (c). The first alkali metal silicate aqueous solution and the acidifying agent can also be simultaneously added once in a single step. The spherically-shaped precipitated silica of the present invention can be formed in the absence of additional mechanical grinding or milling.

DESCRIPTION OF THE INVENTION

Figure 1:
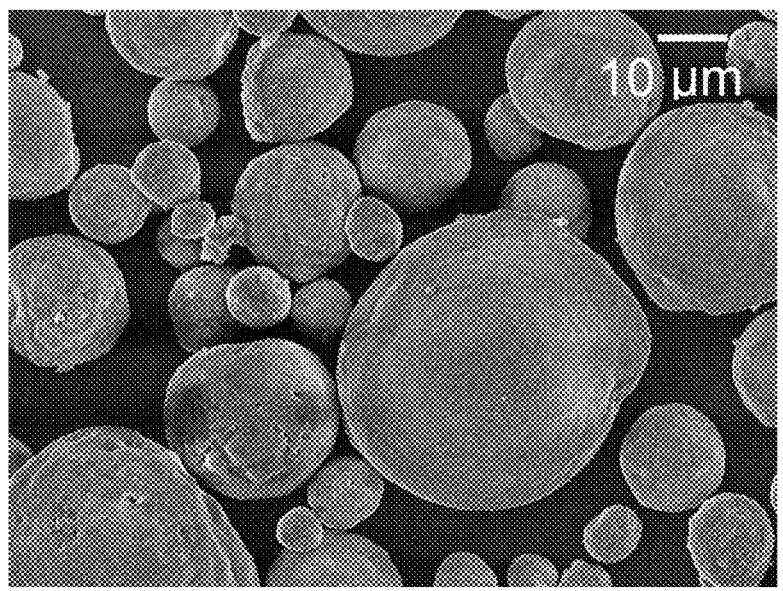
FIG. 1 is a Scanning Electron Microscopy (SEM) image of spherically-shaped powder silica according to the present invention.

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As previously described, the present invention is directed to spherically-shaped silica. As used herein, "spherically-shaped silica" refers to silica particles having a geometry that is spherical or rounded and which has an average circularity of within a range of from 0.7 to 1.0, which is explained in further detail herein. The term "spherical" is used interchangeably herein with the term "circular." The silica particles can be amorphous precipitated silica. Such silica includes, but is not limited to, precipitated agglomerates and/or aggregates of ultimate or primary particles of amorphous silica. The amorphous precipitated silica can also include flocculates of aggregates and/or agglomerates. The silica of the present invention can also comprise various forms including, but not limited to, powder, beads, pearls, and granules. Further, it is appreciated that a sample of the silica can contain various impurities; however, a sample of silica, such as a sample of silica powder, of the present invention can be produced with a content of at least 80 weight %, or at least 90 weight %, of the spherically-shaped silica particles described herein. It is also appreciated that amorphous precipitated silica is different from silica gel and has different properties such as described by R. K. Iler in The Chemistry of Silica, John Wiley & Sons, New York (1979), Library of Congress Catalog No. QD 193, 181.S6144 at pages 15-29, 172-176, 218-233, 364-365, 462-465, 554-564, and 578-579, which is incorporated by reference herein. The difference between amorphous precipitated silica and silica gel is also described in U.S. Pat. No. 5,922,298, which is incorporated by reference herein in its entirety.

In accordance with the present invention, the silica particles are shaped to provide a particular circularity such as, for example, an average circularity within a range from 0.70 to 1.0, or from 0.70 to 0.95, or from 0.70 to 0.90, or from 0.75 to 1.0, or from 0.75 to 0.95, or from 0.75 to 0.90. The circularity is determined by first dispersing silica particles in a Cargille 1.55 RI liquid and analyzing the samples by dark field microscopy using a Nikon Microphot-FXA for phase-contrast microscopy. Ten fields of each silica sample are obtained using the dark field setting and a calibrated 10×2× objective combination. Images are then obtained with a calibrated spot insight digital camera and analyzed by ImageJ software (National Institutes of Health, USA). These calibrated images are converted to thresholded binary (black and white) images and are analyzed for various properties including, but not limited to, area, Feret, MinFeret, aspect ratio, roundness, and solidity. The circularity is then calculated with the following equation: circularity=$4\pi\times$ [Area]/[Perimeter]$^2$ in which the perimeter refers to the length of the outside boundary of the silica and the area refers to the area of the selected silica particle as described in ImageJ user guide, Section 30.7, State of the Art of Compactness and Circularity Measures, International Mathematical Forum, 4, 2009, no. 27, P1306, paragraph 3, which is incorporated by reference herein. A value of 1.0 is a perfectly circular (or spherical) particle. As the value approaches 0.0, the shape of the silica becomes less circular (or spherical). This method is referred to herein as the circularity measurement method.

In addition to the above tests, the particle morphology can also be obtained using Scanning Electron Microscopy (SEM). When SEM is used, the silica samples are sprinkled onto conductive carbon adhesive on SEM Stubs and sputter coated with a nano-layer of gold. High resolution (1024× 1024 pixels) electron micrographs are then obtained at 150× display magnification with an Aspex PSEM II at 5-kV having a secondary electron detector and at 20-kV with a back-scatter electron detector.

The silica of the present invention also has an average ultimate or primary particle size within a range of from 1 to 100 nanometers (nm), such as within a range of from 5 to 50 nm. As used herein, "average ultimate or primary particle size" refers to the average diameter of the smallest silica particles that form the aggregates, agglomerates, and/or secondary particles, and/or in general silica particles. The average ultimate particle size is determined using Transmission Electron Microscopy (TEM).

Further, the silica particles can have a $d_{50}$ particle size of greater than 20 microns (μm), such as greater than 22 μm, or greater than 24 μm. The silica particles can further have a $d_{50}$ particle size of up to 80 μm, up to 70 μm, up to 60 μm, up to 50 μm, up to 40 μm, up to 35 μm, or up to 30 μm. The silica particles can also have a $d_{50}$ particle size selected within a range such as, for example, of greater than 20 μm and up to 80 μm, or greater than 20 μm and up to 60 μm, or greater than 20 μm and up to 40 μm, or greater than 20 μm and up to 30 μm, or greater than 22 μm and up to 30 μm. As used herein, a "$d_{50}$ particle size" refers to the median diameter of a sample of particles where 50 volume percent of the particles have sizes less than the $d_{50}$ value given. The $d_{50}$ particle size is determined by laser diffraction. For instance, the $d_{50}$ particle size can be determined using a Beckman Coulter Inc. (Hialeah, Fla.) model LS 230 laser diffractometer following the instructions contained in the manual. Particle size measurement is further described in U.S. Pat. No. 7,253,224 (column 4, lines 45-63) and U.S. Pat. No. 5,104,221, which are incorporated by reference herein in their entireties.

Moreover, the particles can also have a $d_{90}$ particle size of greater than 40 μm, such as greater than 45 μm, or greater than 50 μm. The silica particles can further have a $d_{90}$ particle size of up to 90 μm, up to 80 μm, up to 70 μm, up to 65 μm, or up to 60 μm. The silica particles can also have a $d_{90}$ particle size selected within a range such as, for example, greater than 40 μm and up to 90 μm, or greater than 40 μm and up to 80 μm, or greater than 50 μm and up to 70 μm, or greater than 45 μm and up to 65 μm, or greater than 50 μm and up to 60 μm. As used herein, a "$d_{90}$ particle size" refers to the average diameter of a sample of particles where 90 volume percent of the particles have sizes smaller than the $d_{90}$ value given. The $d_{90}$ particle size is determined by laser diffraction as previously described.

In addition, the particles can also have a $d_{10}$ particle size of greater than 3 μm, such as greater than 5 μm, or greater than 8 μm. The silica particles can further have a $d_{10}$ particle size of up to 40 μm, up to 30 μm, up to 20 μm, up to 17 μm, or up to 15 μm. The silica particles can also have a $d_{10}$ particle size selected within a range such as, for example, of greater than 3 μm and up to 40 μm, or greater than 3 μm and up to 30 μm, or greater than 5 μm and up to 20 μm, or greater than 5 μm and up to 17 μm, or greater than 8 μm and up to 15 μm. As used herein, a "$d_{10}$ particle size" refers to the average diameter of a sample of particles where 10 volume percent of the particles have sizes smaller than the $d_{10}$ value given. The $d_{10}$ particle size is determined by laser diffraction as previously described.

It is appreciated that the silica particle sizes can be adjusted by post processing methods. For instance, the silica particle sizes can be reduced by post processing methods including, but not limited to, grinding, milling, classification, and combinations thereof. The silica particle sizes can also be enlarged by post processing methods including, but not limited to, granulation, compaction, pelletization, crystallization, and combinations thereof. The silica of the present invention can also be prepared in the absence of post processing methods such as the previously described mechanical post processing methods.

As indicated, the particle size can be determined using laser diffraction. Other methods can also be used to determine particle size. For example, the particle size can also be determined using sieve fraction analysis. In accordance with sieve fraction analysis, silica is sieved for 5 minutes through a nest of sieves on a Retsch AS200 Control Sieve Shaker (vibrator) at a preset amplitude. Each sieve has a "US Mesh" value such as a 50-mesh sieve, 100-mesh sieve, or 200-mesh sieve that corresponds to a certain particle size. The sieves are arranged with the coarsest mesh on top, stepping down in coarseness with a collection pan below the finest mesh sieve. After sieving, the sieves containing the silica are weighed and the weights of the empty sieves are subtracted. The individual net weights are measured, and the sieve fractions are calculated and are expressed as percent retained. This method is referred to herein as the sieve measurement method.

In some examples, at least 90 weight percent, at least 95 weight percent, or at least 96 weight percent of the silica of the present invention can pass through a 200-mesh sieve. Further, in some examples, at least 95 weight percent, at least 98 weight percent, or at least 99 weight percent of the silica of the present invention can pass through a 100-mesh sieve. Further still, in some examples, at least 95 weight percent, at least 98 weight percent, or at least 99 weight percent of the silica of the present invention can pass through a 50-mesh sieve.

Moreover, the silica of the present invention exhibit good friability. As used herein, "friability" describes the tendency of the precipitated silica particles to break into smaller fragments, like agglomerates and/or aggregates, under forces like vibration, pressure, shear, collision, and the like. The friability is determined by probe sonication in which approximately 2.00 g of silica is dispersed into 50 mL deionized water and then sonicated by an Ultrasonic Processor Model VCX 500 sonicator with a tapered horn with a flat tip (probe). The fixed frequency of the probe is 20 kHz and the Amplitude is 100%. Two sonication times, 30 seconds and 60 seconds, are used to break the silica particles. The particle size and size distribution are determined by a laser diffractometer. A smaller particle size after sonication reflects better friability of the silica particles, i.e., an increased tendency to break into smaller fragments.

The silica of the present invention also has a BET surface area within a range from 80 to 600 m$^2$/g, such as within a range from 100 to 550 m$^2$/g, or within a range from 120 to 500 m$^2$/g, or within a range from 150 to 500 m$^2$/g. The BET surface area of the silica is the surface area determined by the Brunauer-Emmett-Teller (BET) method according to ASTM D1993-03 using nitrogen as the adsorbate and modified by outgassing the system and the sample for 60 minutes at 160° C.

The silica can also have a cetyltrimethylammonium bromide (CTAB) surface area within a range from 80 to 500 m$^2$/g, such as within a range from 100 to 450 m$^2$/g, or within a range from 120 to 400 m$^2$/g, or within a range from 150 to 400 m$^2$/g. The CTAB surface area is determined in accordance with the method described in U.S. Pat. No. 8,846,806 at column 9 line 19 to column 10 line 63, and in U.S. Pat. No. 9,073,041 at column 5 line 54 to column 7 line 34, both of which are incorporated herein by reference.

In accordance with the present invention, the silica can have a bulk density (BD) of at least 5 lb/ft$^3$, or at least 8 lb/ft$^3$, or at least 10 lb/ft$^3$, or at least 12 lb/ft$^3$. The silica can further have a BD of up to 30 lb/ft$^3$, up to 25 lb/ft$^3$, or up to 20 lb/ft$^3$, or up to 18 lb/ft$^3$. The silica particles can also have a BD selected within a range such as, for example, from 5 lb/ft$^3$ to 30 lb/ft$^3$, or from 5 lb/ft$^3$ to 25 lb/ft$^3$, or from 8 lb/ft$^3$ to 20 lb/ft$^3$, or from 10 lb/ft$^3$ to 20 lb/ft$^3$, or from 12 lb/ft$^3$ to 18 lb/ft$^3$. The BD is determined using a 100 ml stainless steel cup and a stainless funnel with a trap door. The empty stainless steel cup is cleaned, dried, and tared to zero, and then put under the funnel opening. With the trap door closed, the silica is transferred to the stainless steel funnel to a sufficient amount to overflow the tared cup. The trap door is slowly released and the silica samples are allowed to flow or drop into the steel cup. After the cup is filled, the material in the cup is leveled using a spatula or other straight edged tool. The sample is then weighted to the nearest 0.01 g. The procedure is repeated until a total of six weights have been recorded. The bulk density is calculated from the ratio of the volume and the weight of the silica sample. This method is referred to herein as the BD measurement method.

It was observed that the silica of the present invention exhibits excellent flow behavior. Particularly, no distinct cone is formed after overflowing the cup during the bulk density measurement procedure, which corresponds to a highly free flowing material. It is appreciated that the good flowability of the silica further indicates the spherical shape of the silica particles in comparison with non-spherical particles.

The flowability of the silica is further demonstrated by a low angle of repose (AOR). For instance, the silica of the present invention can have an AOR of less than 30°, or less than 20°, or less than 10°. The AOR is determined using an apparatus having angle markings and dropping a 30 gram±5 gram silica sample from a funnel (4 inch diameter at the top and 0.5 inch at the bottom) from a height of 18 inches into the apparatus to form a conical mound. The bottom surface of the apparatus where the mixture falls consists of two pieces so that one side piece can be separated at the center line of the heap of mixture. The other side of the base, containing angle markings and the funnel, is fixed and joined with the rest of the device. The mobile piece is removed gently and firmly. The angle of the newly created surface of heap (of silica cone) is read on the apparatus with the aid of a straight edge held parallel to the surface. The AOR is measured between 0° and 90°. The lower the AOR, the better the flowability of the silica. This method is referred to herein as the AOR measurement method. The measurement of the AOR is also described in U.S. Pat. No. 7,253,224 at column 10 line 54 to column 11 line 17, which is incorporated by reference herein in its entirety.

In addition, the flowability of the silica is also determined by measuring the time (seconds) it takes a given amount of silica to flow through the opening of a flow cone with a specified diameter opening (mm). The flow cones used in this method are made from glass and have a total height of 80 mm, an inside cylinder diameter of 36 mm. The lower portion of the flow cones taper over a specified height to an opening through which the silica may flow. For example, flow cones used to measure flowability of silica may have the following lower conical dimensions: (i) cone height of 35 mm and opening diameter of 5.0 mm; and (ii) cone height of 30 mm and opening diameter of 8.0 mm. Prior to testing, the flow cone is filled with the material of interest with the bottom orifice closed. Once filled, the bottom is opened and the time for the silica to empty the beaker is recorded as the flowability, in seconds. The silica of the present invention has been found to exhibit a flowability of less than 10 seconds through a beaker having an opening diameter of 5.0 mm and a cone height of 35 mm, such as within in a range from 0.1 seconds to 9 seconds, or within a range from 2 seconds to 8 seconds. The silica of the present invention has been found to exhibit a flowability of less than 10 seconds through a beaker having an opening diameter of 8.0 mm and a cone height of 30 mm, such as within a range from 0.1 second to 8 seconds, or within a range from 1 second to 4 seconds.

The silica of the present invention also has an apparent tamped density (ATD) of greater than 150 g/L, such as greater than 200 g/L, or greater than 220 g/L, or greater than 250 g/L. The silica of the present invention can further have an ATD of up to 500 g/L, such as up to 450 g/L, or up to 400 g/L, or up to 380 g/L. The silica particles can also have an ATD selected within a range such as, for example, of greater than 150 g/L and up to 500 g/L, or of greater than 200 g/L and up to 450 g/L, or greater than 250 g/L and up to 400 g/L. The ATD is determined by ISO 787/11-1981 (E)2 method, which is obtained by measuring a known weight of a silica sample that has been tamped to complete settlement. Specifically, the ATD is obtained by mechanically tapping a 250 ml graduated cylinder containing the sample with a Stampf volumeter Model STAV 2003, set to tap 1250 times per cycle on each sample, until little to no further volume change is observed. After the first cycle, the volume of the silica powder in the 250 ml graduated cylinder is estimated. Another cycle of 1250 tamps is then conducted. The tamping is continued until the change in volume after two successive cycles is approximately 1 ml or less. The final volume is then used to calculate the ATD value in view of the weight of the sample (i.e., the ratio of the weight and the final volume of the sample). This method is referred to herein as the ATD measurement method. It is appreciated that tamped density (TD) or automated tapped density is also equivalent or exchangeable with ATD.

The silica of the present invention also exhibits other superior properties as well. For example, the silica also has a di-octyl adipate (DOA) oil absorption within a range such as, for example, from 150 ml/100 g to 500 ml/100 g, or from 200 ml/100 g to 450 ml/100 g, or from 200 ml/100 g to 400 ml/100 g, or from 220 ml/100 g to 400 ml/100 g. The DOA oil absorption is determined according to ASTM D6854-12a (2014) with a C.W. Brabender Absorptometer-C using di-octyl adipate. The standard speed setting during silica testing is approximately 125 rpm. The standard temperature reading during mixing is approximately 23° C. An endpoint at 70% maximum torque is used for the evaluation, applying moisture correction in the calculation. The results are reported as "ml/100 g".

In addition, the silica of the present invention has a low aspect ratio (AR) such as less than 1.5, or less than 1.2. The AR is determined using ImageJ software to obtain the particle's fitted ellipse, which is the [Major Axis]/[Minor Axis], based on a sample size within a range of from 30 to 90 particles.

Due to the properties described herein, the silica of the present invention can be used to form various compositions and used in a variety of applications. For example, the silica can be used as a flow-aid, polymer reinforcing filler, carrier, pore forming agent, rheology modifier, and coating ingredient. As such, the silica can be used, for example, in a battery separator, as a carrier for animal feed, a reinforcing filler in polymeric materials including rubber materials, and an additive in coatings and adhesives to modify appearance, rheology, and durability.

The present invention is also directed to a method of preparing precipitated silica. The method includes preparing a first alkali metal silicate aqueous solution. The term "alkali metal" refers to an element in Group 1 (International Union of Pure and Applied Chemistry (IUPAC)) of the periodic table of the chemical elements, and includes, e.g., cesium (Cs), francium (Fr), lithium (Li), potassium (K), rubidium (Rb), and sodium (Na). Further, an "alkali metal silicate" refers to a compound formed with an alkali metal and a silicate. In some examples, the alkali metal silicate used with the present invention is a compound represented by $x(SiO_2) \cdot Na_2O$, where x is value selected within a range of from 1 to 4, such as within a range from 2 to 4, or within a range from 3 to 4, including the fractional numbers such as 3.2 for example.

In some examples, when the alkali metal silicate used with the present invention is a compound represented by $x(SiO_2) \cdot Na_2O$, the concentration of the alkali silicate aqueous solution can be determined by $Na_2O$ concentration. The $Na_2O$ is the alkaline portion of the sodium silicate, the concentration of which is determined through titration with methyl orange-xylene cyanol as the indicator, and is used as an indicator for the alkalinity and concentration of sodium silicate in solution. The first alkali metal silicate aqueous solution can have a concentration of less than 85 g/L $Na_2O$, or less than 80 g/L $Na_2O$, or less than 70 g/L $Na_2O$, or less than 60 g/L $Na_2O$.

A second alkali metal silicate aqueous solution can be prepared in a precipitation vessel or reactor equipped with an agitation and heating mechanism. The second alkali metal silicate aqueous solution can be referred to as a foreshot, a heel, a seed, a precursor, or the like for the precipitation reactions. The second alkali metal silicate aqueous solution is prepared using the first alkali metal silicate aqueous solution and water, such that the silicate concentrate is greater than 1 g/L (expressed as $Na_2O$ for $x(SiO_2) \cdot Na_2O$). The pH of the second alkali metal silicate aqueous solution can be greater than 7, or greater than 8, or greater than 9. The reactor is also heated to an appropriate temperature such as a temperature selected within a range of from 100° F. to 220° F., or from 100° F. to 210° F., or from 110° F. to 220° F., or 110° F. to 210° F., or from 110° F. to 205° F. These temperatures can be used for at least a portion of the process of forming the silica or, alternatively, the temperatures can be used throughout the entire process of forming the silica.

Further, the alkalinity of the second alkali metal silicate solution can be expressed as an AZ value. For example, the AZ value can be within a range of from 1 to 40, such as from 1 to 20, or from 1 to 15, or from 5 to 15, or from 6 to 12, or a value of 8 to 10. The AZ value is a measure of the alkalinity of a sample from the reactor obtained by the following method: A 50 mL sample is transferred into a 400 mL beaker having a magnetic stir bar to which about 100 mL of deionized water is added. The resulting mixture is stirred moderately on a magnetic stir plate and six drops of a phenolphthalein indicator [Catalog SP 62-1, Fisher Scientific] is added. The color of the solution is pink. The solution is then titrated with 0.645N HCl from a 50 mL burette until the color of the solution clears. The mL of titrant is recorded and used in the following equation to determine the AZ value.

$$AZ \text{ value} = \frac{(\text{ml of } 0.645N \text{ HCl}) * 64.5}{50}$$

After preparing the second alkali metal silicate aqueous solution in the precipitation vessel, the first alkali metal silicate aqueous solution and an acidifying agent are added simultaneously to the above solution to produce a silica suspension comprising precipitated silica dispersion. Non-limiting examples of suitable acidifying agents include sulfuric acid, hydrochloric acid, phosphoric acid, nitric acid, acetic acid, hydrogen sulfide, chlorine, carbonic acid, sodium bicarbonate, ammonium bicarbonate, sodium acid sulfate, disodium acid phosphate, sulfur dioxide, and mixtures thereof. The first alkali metal silicate aqueous solution and the acidifying agent can be simultaneously added at a fast rate and elevated temperatures such as a temperature selected within any of the ranges previously described. The first alkali metal silicate aqueous solution and the acidifying agent can also be simultaneously added over a short period of time such as over a time period within a range of from 2 to 100 minutes, or within a range from 10 to 60 minutes, or within a range from 30 to 60 minutes, or within a range from 40 to 50 minutes.

During the simultaneous addition steps, the alkalinity of the solution (expressed as the AZ value) can be maintained or can be varied during the precipitation process. In some examples, the AZ value decreases during the simultaneous addition step, for example from 15 to 1, or from 10 to 4.

An aging step is then conducted after forming the silica suspension. The pH of the suspension is adjusted to a pH within a range from 7 to 14, such as a pH from 7 to 10 or from 7.5 to 9, at the beginning of the aging step. Subsequently, an additional acidifying agent is added to the aged suspension to bring the pH of the final aged solution below 7, such as below 6, or below 5. The suspension can be aged for a period of time selected within a range of from 1 minute to 120 minutes, such as within a range from 20 minutes to 90 minutes, or within a range from 20 minutes to 60 minutes, or for about 30 minutes.

In some examples, the simultaneous addition and aging steps can be competed in less than 150 minutes, such as less than 130 minutes, or less than 120 minutes, or less than 100 minutes, or less than 80 minutes, or less than 60 minutes, or less than 40 minutes.

The precipitation reaction of the silica is completed at the end of the aging process. At least a portion or the entire precipitation can take place at elevated temperatures such as a temperature selected within any of the ranges previously described. The entire precipitation process can also be completed in a period of time selected within a range from 40 minutes to 100 minutes, such as within a range from 60 minutes to 100 minutes, or within a range from 70 minutes to 90 minutes, or for about 80 minutes.

After aging, the silica suspension is washed and dried. The drying process can include dispersing the precipitated silica in an aqueous medium and then spray drying the silica. The precipitated silica can be dispersed in an aqueous medium to form a solution with a solids content of less than 20%, or less than 15%, or within in a range of from 12% to 13%. As used herein, an "aqueous medium" refers to a liquid medium that comprises 50% or more water, or 60% or more water, or 70% or more water, or 80% or more water, or 85% or more water. The remaining portion of the aqueous medium can include organic solvents.

By controlling the reaction conditions and components, the previously described process helps reduce large agglomerate formation to produce fine spherically shaped silica. For instance, the first alkali metal silicate aqueous solution concentration is lowered to reduce larger agglomerate formation. The reactor temperature also helps achieve desired primary particle sizes and aggregate strength. Further, the previously described reaction times also help achieve fine particle size distribution. The solid content during the spray drying step is also lower to produce fine dry particles from the drier. It is appreciated that the previously described process can be free of milling, screening, or classification steps. As such, the spherical precipitated silica can be formed without mechanical grinding or milling processing as well as chemical milling processing.

The following examples are presented to demonstrate the general principles of the invention. The invention should not be considered as limited to the specific examples presented. All parts and percentages in the examples are by weight unless otherwise indicated.

Comparative Example 1

Precipitated Silica Powder Preparation

A stock silicate solution having a $Na_2O$ concentration of 85 g/L and a $SiO_2$:$Na_2O$ molar ratio of 3.2:1 was prepared in a 150 L reactor equipped with steam heating coils, an acid inlet, a sodium silicate inlet, a draining outlet, a main agitator, and a supplementary high-speed agitator near the acid inlet for enhanced dispersion. The silicate and acid flow rate were controlled with a programmed computer for good consistency and accuracy. About 75 L of water was first discharged into the reactor and then heated up to 168° F. using the steam coil. Over a period of 4-5 minutes, 2.4 L of sodium silicate (3.2$SiO_2$.$Na_2O$) was discharged into the reactor with the main agitator on. After addition of sodium silicate, the $Na_2O$ concentration in the reactor was around 2.6 g/L for the alkali metal silicate solution ("foreshot"). The initial AZ (alkalinity) number was about 7.7 in the foreshot. Next, with the secondary agitator (or high shear agitator) near the acid inlet turned on, 47.3 L sodium silicate and 3.2 L concentrated sulfuric acid (96%) were simultaneously discharged into the reactor over a period of 90 minutes. At the end of this simultaneous addition step, the pH of the solution in the reactor was around 9.5. A 130 minutes aging was then conducted. The AZ (alkalinity) number during the simultaneous addition step was maintained in a range of 7.7~8.0 in the first 25 minutes, by adjusting of the acid feed rate. Thus, this precipitation was an AZ (alkalinity) controlled precipitation process. At the beginning of the aging step, additional acid was discharged into the reactor until a pH of 8.5 was reached. About 0.01 L/minutes of $H_2SO_4$ (96%) was added into the reactor for approximately 30 minutes to drop the pH from 9.5 to 8.5. After completion of the aging step which provided the final precipitated silica, the pH was adjusted to 4.0 by adding $H_2SO_4$ (96%) at a feed rate of 0.01 L/minutes in order to neutralize all unreacted alkaline species.

Throughout the precipitation of the silica, the temperature of the reactor was maintained at 168° F. At the conclusion of all precipitation steps in the precipitator, the resulting slurry was transferred to a filter press, and washed with water until the conductivity of the washing water reached approximately 1 mS. The resulting filter cake had a solid content of about 24%. The filter cake was removed from the filter press and dropped into a liquefier, where the filter cake was liquefied by an agitator into a pumpable silica slurry with a solid content of about 18% in water. The silica slurry was then dried with a Niro spray drier having a rotary atomizer.

Example 2

Precipitated Silica Powder Preparation

A stock silicate solution having a molar ratio of 3.2 $SiO_2.Na_2O$ was diluted in water to form a $Na_2O$ concentration of 55 g/L. About 83 L of water was then discharged into a 150 L reactor as described in Comparative Example 1 and the reactor was heated to 190° F. by the heating coil. Over a period of 4-5 minutes, 4.1 L of sodium silicate (3.2 $SiO_2.Na_2O$) was discharged into the reactor with the main agitator on. The target $Na_2O$ concentration in the reactor was approximately 3.0±0.1 g/L $Na_2O$ in the foreshot. The initial AZ (alkalinity) number was about 8.6 in the foreshot. In the simultaneous addition step, 41 L of sodium silicate (55 g/L $Na_2O$) and 1.94 L of concentrated sulfuric acid (96%) were added into the reactor over a period of 40 minutes to produce silica precipitate and sodium sulfate. At the end of the simultaneous addition step, the pH of the reactant was approximately 9.4. The AZ (alkalinity) number during the simultaneous addition step was maintained in a range of 8.69.0 in the first 25 minutes, by adjusting of the acid feed rate. Thus, this precipitation was an AZ (alkalinity) controlled precipitation process. A 30 minutes aging was then conducted. At the beginning of the aging step, the pH of the solution was adjusted to 8.5 using sulfuric acid at a discharge rate of 48 ml/minutes. After completion of the aging step which completed the precipitation of the silica, the pH was adjusted to 4.5 by adding sulfuric acid at a flow rate of 48 ml/minutes.

Throughout the precipitation process, the temperature of the reactor was maintained at 190° F. Total precipitation time was about 90 minutes from the beginning to the end, which was approximately less than ½ of the precipitation time from Comparative Example 1. The silica precipitates were then transferred to a filter press, washed to form a filter cake with approximately 18% solids content. Prior to spray drying, the filter cake was liquefied to form a pumpable slurry with 12-13% solid content. The silica was dried in a Niro drier with a rotary atomizer.

Example 3

Precipitated Silica Powder Preparation

A stock silicate solution having a molar ratio of 3.2 $SiO_2.Na_2O$ was diluted in water to form a $Na_2O$ concentration of 55 g/L. About 415 L of water was then discharged into a 200 Gal reactor as described in Comparative Example 1 and the reactor was heated to 201° F. by the heating coil. Over a period of 4-5 minutes, 26.5 L of sodium silicate (3.2 $SiO_2.Na_2O$) was discharged into the reactor with the main agitator on. The target $Na_2O$ concentration in the reactor was approximately 3.3±0.1 g/L in the foreshot. The initial AZ (alkalinity) number was about 8.9 in the foreshot. In the simultaneous addition step, 205.3 L of sodium silicate (55 g/L $Na_2O$) and 9.64 L of concentrated sulfuric acid (96%) were added into the reactor over a period of 40 minutes to produce silica precipitate and sodium sulfate. The AZ (alkalinity) number during the simultaneous addition dropped from 8.9 to 6.4 at a constant acid feed rate after 40 minutes. Thus, this precipitation was an AZ (alkalinity) controlled precipitation process. At the end of the simultaneous addition step, the pH of the reactant was approximately 8.9. A 30 minutes aging was then conducted. At the beginning of the aging step, the pH of the solution was adjusted to 8.5 using 0.2 L of sulfuric acid. After completion of the aging step which completed the precipitation of the silica, the pH was adjusted to 4.5 by adding 1 L of sulfuric acid.

Throughout the precipitation process, the temperature of the reactor was maintained at 201° F. Total precipitation time was about 80 minutes from the beginning to the end, which was approximately less than ⅓ of the precipitation time from Comparative Example 1. The silica precipitates were then transferred to a filter press, washed to form a filter cake with approximately 18% solids content. Prior to spray drying, the filter cake was liquefied to form a pumpable slurry with 12% solid content. The silica was dried in a Niro drier with a rotary atomizer.

Example 4

Precipitated Silica Powder Preparation

A stock silicate solution having a molar ratio of 3.2 $SiO_2.Na_2O$ was diluted in water to form a $Na_2O$ concentration of 55 g/L. About 83 L of water was then discharged into a 150 L reactor as described in Comparative Example 1 and the reactor was heated to 200° F. by the heating coil. Over a period of 4-5 minutes, 4.1 L of sodium silicate (3.2 $SiO_2.Na_2O$) was discharged into the reactor with the main agitator on. The target $Na_2O$ concentration in the reactor was approximately 3.3±0.1 g/L in the foreshot. The initial AZ (alkalinity) number was about 9.0 in the foreshot. In the simultaneous additional step, 41 L of sodium silicate (55 g/L $Na_2O$) and 1.94 L of concentrated sulfuric acid (96%) were added into the reactor over a period of 40 minutes to produce silica precipitate and sodium sulfate. The AZ (alkalinity) number during simultaneous addition dropped from 9.0 to 6.3 at a constant acid feed rate after 35 minutes. Thus, this precipitation was a volume-controlled precipitation process. At the end of the simultaneous addition step, the pH of the reactant was approximately 9.4. A 30 minutes aging was then conducted. At the beginning of the aging step, the pH of the solution was adjusted to 8.5 using sulfuric acid at a discharge rate of 48 ml/minutes. After completion of the aging step which completed the precipitation of the silica, the pH was adjusted to 4.5 by adding sulfuric acid at a flow rate of 48 ml/minutes.

Throughout the precipitation process, the temperature of the reactor was maintained at 200° F. Total precipitation time was about 80 minutes from the beginning to the end, which was approximately less than ⅓ of the precipitation time from Comparative Example 1. The silica precipitates were then transferred to a filter press, washed to form a filter cake with approximately 18% solids content. Prior to spray drying, the filter cake was liquefied to form a pumpable slurry with 12-13% solid content. The silica was dried in a Niro drier with a rotary atomizer.

Example 5

Precipitated Silica Powder Preparation

A stock silicate solution having a molar ratio of 3.2 $SiO_2.Na_2O$ was diluted in water to form a $Na_2O$ concentration of 55 g/L. About 83 L of water was then discharged into a 150 L reactor as described in Comparative Example 1 and the reactor was heated to 180° F. by the heating coil. Over a period of 4-5 minutes, 4.1 L of sodium silicate (3.2 $SiO_2.Na_2O$) was discharged into the reactor with the main agitator on. The target $Na_2O$ concentration in the reactor was approximately 3.3±0.1 g/L in the foreshot. The initial AZ (alkalinity) number was about 9.7 in the foreshot. In the simultaneous addition step, 41 L of sodium silicate (55 g/L $Na_2O$) and 1.94 L of concentrated sulfuric acid (96%) were added into the reactor over a period of 40 minutes to produce silica precipitate and sodium sulfate. The AZ (alkalinity) number during simultaneous addition dropped from 9.7 to 6.6 at a constant acid feed rate after 40 minutes. Thus, this precipitation was a volume-controlled precipitation process. At the end of the simultaneous addition step, the pH of the reactant was approximately 9.4. A 30 minutes aging was then conducted. At the beginning of the aging step, the pH of the solution was adjusted to 8.5 using sulfuric acid at a discharge rate of 48 ml/minutes. After completion of the aging step which completed the precipitation of the silica, the pH was adjusted to 4.5 by adding sulfuric acid at a flow rate of 48 ml/minutes.

Throughout the precipitation process, the temperature of the reactor was maintained at 180° F. Total precipitation time was about 80 minutes from the beginning to the end, which was approximately less than ⅓ of the precipitation time from Comparative Example 1. The silica precipitates were then transferred to a filter press, washed to form a filter cake with approximately 18% solids content. Prior to spray drying, the filter cake was liquefied to form a pumpable slurry with 12-13% solid content. The silica was dried in a Niro drier with a rotary atomizer.

Example 6

Precipitated Silica Powder Preparation

A stock silicate solution having a molar ratio of 3.2 $SiO_2.Na_2O$ was diluted in water to form a $Na_2O$ concentration of 55 g/L. About 83 L of water was then discharged into a 150 L reactor as described in Comparative Example 1 and the reactor was heated to 170° F. by the heating coil. Over a period of 4-5 minutes, 4.1 L of sodium silicate (3.2 $SiO_2.Na_2O$) was discharged into the reactor with the main agitator on. The target $Na_2O$ concentration in the reactor was approximately 3.3±0.1 g/L in the foreshot. The initial AZ (alkalinity) number was about 9.4 in the foreshot. In the simultaneous addition step, 41 L of sodium silicate (55 g/L $Na_2O$) and 1.94 L of concentrated sulfuric acid (96%) were added into the reactor over a period of 40 minutes to produce silica precipitate and sodium sulfate. The AZ (alkalinity) number during the simultaneous addition dropped from 9.4 to 5.8 at a constant acid feed rate after 40 minutes. Thus, this precipitation was a volume-controlled precipitation process. At the end of the simultaneous addition step, the pH of the reactant was approximately 9.4. A 30 minutes aging was then conducted. At the beginning of the aging step, the pH of the solution was adjusted to 8.5 using sulfuric acid at a discharge rate of 48 ml/minutes. After completion of the aging step which completed the precipitation of the silica, the pH was adjusted to 4.5 by adding sulfuric acid at a flow rate of 48 ml/minutes.

Throughout the precipitation process, the temperature of the reactor was maintained at 170° F. Total precipitation time was about 80 minutes from the beginning to the end, which was approximately less than ⅓ of the precipitation time from Comparative Example 1. The silica precipitates were then transferred to a filter press, washed to form a filter cake with approximately 18% solids content. Prior to spray drying, the filter cake was liquefied to form a pumpable slurry with 12-13% solid content. The silica was dried in a Niro drier with a rotary atomizer.

Example 7

Precipitated Silica Powder Preparation

A stock silicate solution having a molar ratio of 3.2 $SiO_2.Na_2O$ was diluted in water to form a $Na_2O$ concentration of 55 g/L. About 83 L of water was then discharged into a 150 L reactor as described in Comparative Example 1 and the reactor was heated to 160° F. by the heating coil. Over a period of 4-5 minutes, 4.1 L of sodium silicate (3.2 $SiO_2.Na_2O$) was discharged into the reactor with the main agitator on. The target $Na_2O$ concentration in the reactor was approximately 3.3±0.1 g/L in the foreshot. The initial AZ (alkalinity) number was about 9.6 in the foreshot. In the simultaneous addition step, 41 L of sodium silicate (55 g/L $Na_2O$) and 1.94 L of concentrated sulfuric acid (96%) were added into the reactor over a period of 40 minutes to produce silica precipitate and sodium sulfate. The AZ (alkalinity) number during the simultaneous addition dropped from 9.6 to 5.9 at a constant acid feed rate after 40 minutes. Thus, this precipitation was a volume-controlled precipitation process. At the end of the simultaneous addition step, the pH of the reactant was approximately 9.4. A 30 minutes aging was then conducted. At the beginning of the aging step, the pH of the solution was adjusted to 8.5 using sulfuric acid at a discharge rate of 48 ml/minutes. After completion of the aging step which completed the precipitation of the silica, the pH was adjusted to 4.5 by adding sulfuric acid at a flow rate of 48 ml/minutes.

Throughout the precipitation process, the temperature of the reactor was maintained at 160° F. Total precipitation time was about 80 minutes from the beginning to the end, which was approximately less than ⅓ of the precipitation time from Comparative Example 1. The silica precipitates were then transferred to a filter press, washed to form a filter cake with approximately 18% solids content. Prior to spray drying, the filter cake was liquefied to form a pumpable slurry with 12-13% solid content. The silica was dried in a Niro drier with a rotary atomizer.

Example 8

Precipitated Silica Powder Preparation

A stock silicate solution having a molar ratio of 3.2 $SiO_2.Na_2O$ was diluted in water to form a $Na_2O$ concentration of 55 g/L. About 83 L of water was then discharged into a 150 L reactor as described in Comparative Example 1 and the reactor was heated to 120° F. by the heating coil. Over a period of 4-5 minutes, 4.1 L of sodium silicate (3.2 $SiO_2.Na_2O$) was discharged into the reactor with the main agitator on. The target $Na_2O$ concentration in the reactor was approximately 3.3±0.1 g/L in the foreshot. The initial AZ (alkalinity) number was about 9.3 in the foreshot. In the simultaneous addition step, 41 L of sodium silicate (55 g/L $Na_2O$) and 1.94 L of concentrated sulfuric acid (96%) were added into the reactor over a period of 40 minutes to produce silica precipitate and sodium sulfate. The AZ (alkalinity) number during the simultaneous addition dropped from 9.3 to 7.8 at a constant acid feed rate after 20 minutes. Thus, this precipitation was a volume-controlled precipitation process. At the end of the simultaneous addition step, the pH of the reactant was approximately 9.4. A 30 minutes aging was then conducted. At the beginning of the aging step, the pH of the solution was adjusted to 8.5 using sulfuric acid at a discharge rate of 48 ml/minutes. After completion of the aging step which completed the precipitation of the silica, the pH was adjusted to 4.5 by adding sulfuric acid at a flow rate of 48 ml/minutes.

Throughout the precipitation process, the temperature of the reactor was maintained at 120° F. Total precipitation time was about 80 minutes from the beginning to the end, which was approximately less than ⅓ of the precipitation time from Comparative Example 1. The silica precipitates were then transferred to a filter press, washed to form a filter cake with approximately 18% solids content. Prior to spray drying, the filter cake was liquefied to form a pumpable slurry with 12-13% solid content. The silica was dried in a Niro drier with a rotary atomizer.

The alkalinity and Foreshot $Na_2O$ of Examples 1-8 are further illustrated in Table 1.

TABLE 1

| Property | | Comp Ex. 1 | Ex. 2 | Ex. 3 | Ex. 4 | Ex. 5 | Ex. 6 | Ex. 7 | Ex. 8 |
|---|---|---|---|---|---|---|---|---|---|
| Foreshot $Na_2O$ (g/L) | | 2.7 | 3.0 | 3.4 | 3.4 | 3.4 | 3.3 | 3.4 | 3.4 |
| AZ values in simultaneous addition step | 0 min | 7.7 | 8.6 | 8.9 | 9.0 | 9.7 | 9.4 | 9.6 | 9.3 |
| | 5 min | 7.9 | 8.9 | | 8.9 | | | | |
| | 10 min | | | 8.2 | | 9.0 | 8.4 | 8.6 | 8.4 |
| | 15 min | 7.9 | 9.0 | | 8.4 | | | | |
| | 20 min | | | 7.1 | | 8.0 | 7.6 | 7.9 | 7.8 |
| | 25 min | 8.0 | 8.6 | | 7.1 | | | | |
| | 30 min | | | 6.8 | | 7.1 | 7.0 | 7.0 | |
| | 35 min | | | | 6.3 | | | | |
| | 40 min | | | 6.4 | | 6.6 | 5.8 | 5.9 | |

Example 9

Property Evaluation of the Precipitated Silica Powder

The precipitated silica formed in Comparative Example 1 and Examples 2-9 were evaluated for various properties. Table 2 lists the properties of the precipitated silica.

TABLE 2

| Property | Comp. Ex.1 | Ex. 2 | Ex. 3 | Ex. 4 | Ex. 5 | Ex. 6 | Ex. 7 | Ex. 8 |
|---|---|---|---|---|---|---|---|---|
| BET ($m^2$/g) [a] | 174 | 203 | 174 | 151 | 231 | 304 | 351 | 485 |
| CTAB ($m^2$/g) [b] | 144 | 185 | 172 | 150 | 221 | 254 | 283 | 368 |
| DOA oil absorption (ml/100 g) [c] | 246 | 265 | 245 | 266 | 255 | 331 | 315 | 266 |
| $N_2$ Pore Vol (ml/g) [d] | 0.83 | 1.26 | 0.99 | 0.90 | 1.57 | 1.73 | 1.74 | 1.33 |
| Avg Pore Diameter (nm) [e] | 24.59 | 29.10 | 24.68 | 27.38 | 30.34 | 21.21 | 20.28 | 9.52 |
| $d_{10}$ (μm) [f] | 10 | 12 | 9.9 | 12 | 11 | 9 | 9.8 | 7.6 |
| $d_{50}$ (μm) [f] | 33.0 | 27.7 | 24.3 | 27.4 | 26.7 | 24.3 | 26.8 | 26.5 |
| $d_{50}$, 30 s sonication (μm) [g] | 13.0 | 7.5 | 17.7 | 4.4 | 17.3 | 22.1 | 23.6 | 22.6 |
| $d_{50}$, 60 s sonication (μm) [g] | 10.0 | 0.5 | 7.3 | 0.4 | 6.9 | 19.4 | 22.0 | 21.4 |
| $d_{90}$ (μm) [f] | 70 | 54 | 51 | 53 | 53 | 55 | 60 | 56 |
| Particle Size S.D. [h] | 2.05 | 1.79 | 1.88 | 1.79 | 1.80 | 2.01 | 2.03 | 2.14 |
| ATD (g/L) [i] | 255 | 264 | 278 | 247 | 276 | 301 | 307 | 366 |
| BD (lb/$ft^3$) [j] | 11.8 | 13.1 | 13.2 | 12 | 13.6 | 14.7 | 15.3 | 18.1 |
| Retained sieve % - 50 mesh [k] | 0.3 | — | 0.2 | 0.2 | 0.3 | 0.2 | 0.2 | 0.3 |
| Retained sieve % - 100 mesh [k] | 0.4 | 0.5 | 0.4 | 0.3 | 0.6 | 0.6 | 0.5 | 0.4 |

TABLE 2-continued

| Property | Comp. Ex.1 | Ex. 2 | Ex. 3 | Ex. 4 | Ex. 5 | Ex. 6 | Ex. 7 | Ex. 8 |
|---|---|---|---|---|---|---|---|---|
| Retained sieve % - 200 mesh [k] | 55.8 | 2.5 | 1.2 | 1.2 | 1.5 | 2.2 | 2.7 | 1.6 |
| Sieve % - Collection Pan [l] | 43.5 | 97.0 | 98.2 | 98.3 | 97.6 | 97.0 | 96.6 | 97.7 |

[a] BET surface area was determined using the Brunauer-Emmett-Teller (BET) method according to ASTM D1993-03 using nitrogen as the adsorbate and modified by outgassing the system and the sample for 60 minutes at 160° C. A TriStar ® 3000 (available from Micromeritics Instrument Corporation) was used for multipoint BET Nitrogen surface areas, with five relative pressure points.
[b] CTAB surface area was determined in accordance with the method described in U.S. Pat. No. 8,846,806 at column 9 line 19 to column 10 line 63, and in U.S. Pat. No. 9,073,041 at column 5 line 54 to column 7 line 34, both of which are incorporated herein by reference.
[c] As determined by C. W. Brabender Absorptometer-C using di-octyl adipate. The standard speed setting during silica testing was approximately 125 rpm. The standard temperature reading during mixing was approximately 23° C.
[d] $N_2$ pore volume was determined by Multipoint BET method on Micromeritics TriStar 3000 ™ instrument. "Pore volume" herein refers to BJH (Barrett-Joyner-Halenda) deposition cumulative pore volume of pores, $cm^3/g$. The BJH (Barret-Joyner-Halenda) analysis, as known to one skilled in the art, is initiated to determine pore area and specific pore volume utilizing the nitrogen desorption isotherm across multiple relative pressures. A minimum of 48 points were recorded and analyzed by the instrument software for these analyses.
[e] Average pore diameter was determined by Multipoint BET method on Micromeritics TriStar 3000 ™ instrument as previously described with respect to $N_2$ pore volume. "Average pore diameter" herein refers to BJH desorption average pore diameter, Å.
[f] $d_{10}$, $d_{50}$, and $d_{90}$ particle sizes were determined on aqueous suspensions of the silica using a Beckman Coulter Inc. (Hialeah, Fla.) model LS 230 laser diffractometer following the instructions contained in the manual.
[g] Modified $d_{10}$, $d_{50}$, and $d_{90}$ particle sizes were determined with a Beckman Coulter Inc. (Hialeah, Fla.) model LS 230 laser diffractometer following the instructions contained in the manual after a 30 second or 60 second probe sonication of the silica suspension to effect mechanical breakage.
[h] Particle size standard deviation was determined by a Beckman Coulter LS 230 following the instructions contained in the Beckman Coulter LS 230 manual.
[i] ATD was determined using the ATD measurement method previously described.
[j] BD was determined using the BD measurement method previously described.
[k] The 50, 100, and 200 sieve % was determined using the sieve measurement method previously described with the appropriate sized mesh sieves.
[l] The sieve % in the collection pan was the total amount of particles that were distributed through the meshes.

Example 10

Shape and Flowability Evaluation of the Precipitated Silica Powder

The shape and flowability of the precipitated silica formed in Comparative Example 1 and Examples 2 and 3 were also evaluated. Table 3 lists the shape and flowability properties.

TABLE 3

| Property | Comp. Ex. 1 | Ex. 2 | Ex. 3 |
|---|---|---|---|
| Circularity [m] | 0.65 | 0.83 | 0.86 |
| Circularity STD [n] | 0.13 | 0.06 | 0.09 |
| Aspect Ratio [o] | 1.22 | 1.13 | 1.16 |
| Aspect Ratio STD [p] | 0.23 | 0.15 | 0.23 |
| AOR [q] | N/A | ~0 | ~0 |
| Flowability, Beaker A (seconds) [r] | No flow | 6 | 5 |
| Flowability, Beaker B (seconds) [r] | No flow | 2 | 2 |

[m] Circularity was determined using the circularity measurement method previously described based on a sample size within a range from 30 to 90 particles.
[n] Circularity standard deviation was the standard deviation based on the circularity measurements.
[o] Aspect ratio was determined using ImageJ to obtain the particle's fitted ellipse, which is the [Major Axis]/[Minor Axis], based on a sample size within a range from 30 to 90 particles.
[p] Aspect ratio standard deviation was the standard deviation based on the aspect ratio measurements.
[q] Angle of Repose was determined using the AOR measurement method previously described.
[r] Flowability was determined using the beaker flow measurement method previously described. Both beaker A and beaker B had a height of 80 mm, an inside diameter of 36 mm, and an outside diameter of 40 mm. Beaker A had an opening diameter of 5.0 mm and cone height of 35 mm, while beaker B had an opening diameter of 8.0 mm and cone height of 30 mm.

As shown in Table 3, the silica prepared in Examples 2 and 3 according to the present invention exhibited a highly spherical particle as compared to the silica particle prepared in Comparative Example 1 which exhibited less sphericity as indicated by the circularity values. In addition, the AOR of the silica from Comparative Example 1 could not be determined because the sample adhered to the funnel, and did not flow. Further, the AOR of the silica prepared in Examples 2 and 3 according to the present invention spread out without forming a distinct cone and, therefore, was designated an AOR of about 0.

Figure 2:
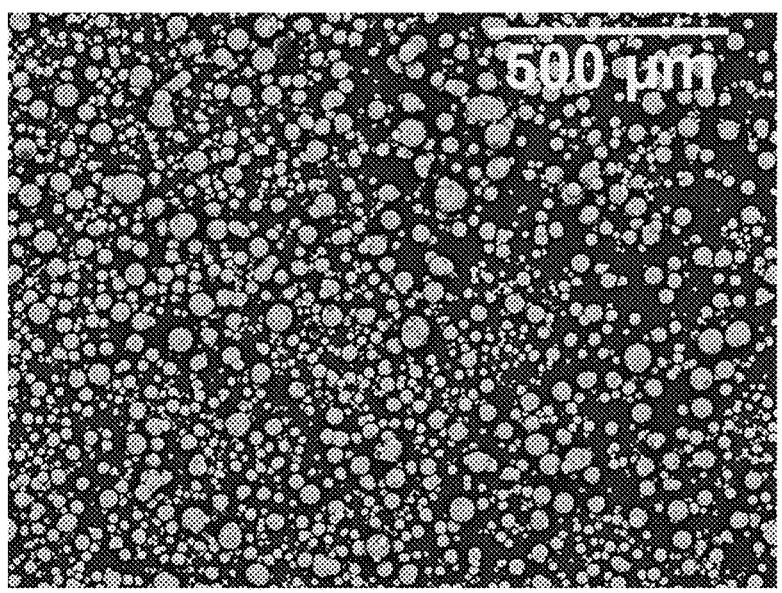
FIG. 2 is a SEM image of the spherically-shaped silica powder shown in FIG. 1 with a different magnification degree.
Figure 3:
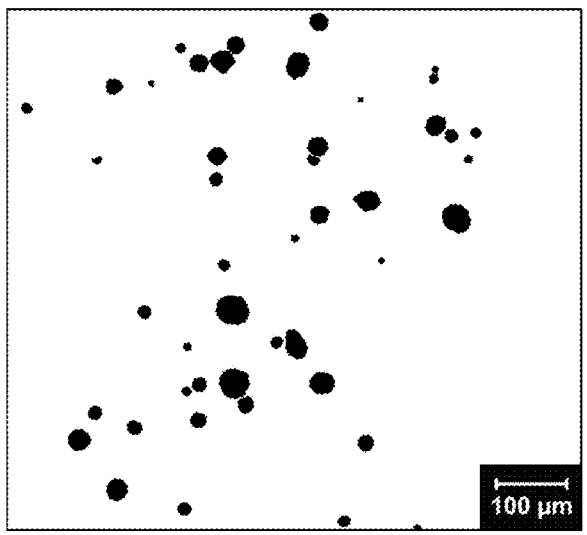
FIG. 3 is an ImageJ particle shape analysis of the spherically-shaped silica powder shown in FIGS. 1 and 2.

To further analyze the shape, silica prepared in Example 2 was evaluated using various imaging techniques and which is illustrated in FIGS. 1-3. Particularly, FIG. 1 is a SEM image of the spherically-shaped silica obtained in Example 2, FIG. 2 is a SEM image of the spherically-shaped silica obtained in Example 2 with a different magnification degree than FIG. 1, and FIG. 3 is an ImageJ particle analysis of the spherically-shaped silica of Example 2. As shown in FIGS. 1-3, the silica prepared in Example 2 was highly spherical/circular.

The present invention is also directed to the following clauses.

Clause 1: Spherically-shaped silica comprising: a $d_{50}$ particle size selected within a range of greater than 20 μm and up to 80 μm; a di-octyl adipate oil absorption selected within a range of from 150 ml/100 g to 500 ml/100 g; an average circularity selected within a range of from 0.70 to 1.0; and an angle of repose of less than 30°, wherein the spherically-shaped silica is a precipitated silica powder.

Clause 2: The spherically-shaped precipitated silica of clause 1, wherein the spherically-shaped silica comprises an average tamped density of greater than 150 g/l.

Clause 3: The spherically-shaped precipitated silica of clause 1, wherein the spherically-shaped silica comprises an average tamped density of greater than 250 g/l.

Clause 4: The spherically-shaped precipitated silica of any of clauses 1-3, wherein the spherically-shaped silica comprises a BET surface area of 80 to 600 $m^2/g$.

Clause 5: The spherically-shaped precipitated silica of any of clauses 1-4, wherein the spherically-shaped silica comprises a CTAB surface area of 80 to 500 $m^2/g$.

Clause 6: The spherically-shaped precipitated silica of any of clauses 1-5, wherein the spherically-shaped silica comprises a $d_{10}$ particle size selected within a range of greater than 3 μm and up to 40 μm.

Clause 7: The spherically-shaped precipitated silica of any of clauses 1-6, wherein the spherically-shaped silica comprises a $d_{90}$ particle size selected within a range of greater than 40 μm and up to 90 μm.

Clause 8: The spherically-shaped precipitated silica of any of clauses 1-7, wherein at least 90 weight % of a sample of the spherically-shaped silica passes through a 200-mesh sieve.

Clause 9: The spherically-shaped precipitated silica of any of clauses 1-8, wherein the spherically-shaped silica comprises a bulk density selected within a range of at least 5 lb/ft$^3$ and up to 30 lb/ft$^3$.

Clause 10: The spherically-shaped precipitated silica of any of clauses 1-9, wherein the spherically-shaped silica has an average circularity selected within a range of from 0.70 to 0.95.

Clause 11: A process of preparing spherically-shaped precipitated silica powder comprising: a) preparing a first alkali metal silicate aqueous solution; b) preparing a second alkali metal silicate aqueous solution having a pH of greater than 7 with the first alkali metal silica aqueous solution and water; c) simultaneously adding the first alkali metal silicate aqueous solution and an acidifying agent to the second aqueous alkali metal silicate aqueous solution to form a silica suspension comprising precipitated silica; d) aging the silica suspension at a pH within a range from 7 to 14; and e) washing and drying the precipitated silica, wherein the total time for steps c) and d) is less than 150 minutes.

Clause 12: The process of clause 11, further comprising adding an additional acidifying agent after the aging such that the pH of the suspension is less than 7.

Clause 13: The process of clauses 11 or 12, wherein the drying of the precipitated silica comprises dispersing the silica in an aqueous medium and spray drying the dispersed silica.

Clause 14: The process of clause 13, wherein the precipitated silica is dispersed in the aqueous medium to form a solution with a solids content of less than 20%.

Clause 15: The process of any of clauses 11-14, wherein at least one of steps a) through d) are performed at a temperature selected within a range of from 100° F. to 220° F.

Clause 16: The process of any of clauses 11-15, wherein the first alkali metal silicate aqueous solution and the acidifying agent are simultaneously added in step c) over a time period within a range from 2 to 90 minutes.

Clause 17: The process of any of clauses 11-16, wherein the silica suspension is aged in step d) for a period of time selected within a range from 1 minute to 120 minutes.

Clause 18: The process of any of clauses 11-17, wherein at least one of the first and second alkali metal silicate aqueous solutions is represented by $x(SiO_2).Na_2O$, wherein x is a value selected within a range of from 1 to 4.

Clause 19: The process of any of clauses 11-18, wherein the first alkali metal silicate aqueous solution has a concentration of less than 85 g/L $Na_2O$.

Clause 20: The process of any of clauses 11-19, wherein the second alkali metal silicate aqueous solution has an alkalinity AZ value selected within a range of from 1 to 40.

Clause 21: The process of any of clauses 11-20, wherein an alkalinity AZ value of the second alkali metal silicate aqueous solution decreases during the simultaneous addition step c).

Clause 22: The process of any of clauses 11-21, wherein an alkalinity AZ value of the second alkali metal silicate aqueous solution is maintained during the simultaneous addition step c).

Clause 23: The process of any of clauses 11-22, wherein the spherically-shaped precipitated silica is formed in the absence of additional mechanical grinding or milling.

Clause 24: The process of any of clauses 11-23, wherein the first alkali metal silicate aqueous solution and the acidifying agent are simultaneously added once in a single step.

Clause 25: A composition comprising the spherically-shaped precipitated silica of any of clauses 1-10.

Clause 26: The composition of clause 25, wherein the composition is a rubber composition.

Clause 27: The composition of clause 25, wherein the composition is a coating composition.

Clause 28: The composition of clause 25, wherein the composition is a porous polymer membrane composition.

Clause 29: The composition of clause 25, wherein the composition is a carrier or adsorbent composition.

Whereas particular embodiments of this invention have been described above for purposes of illustration, it will be evident to those skilled in the art that numerous variations of the details of the present invention may be made without departing from the invention as defined in the appended claims.

The invention claimed is:

1. Spherically-shaped silica comprising:
a $d_{50}$ particle size selected within a range of greater than 20 μm and up to 80 μm;
a di-octyl adipate oil absorption selected within a range of from 150 ml/100 g to 500 ml/100 g;
an average circularity selected within a range of from 0.70 to 1.0; and
an angle of repose of less than 30°,
wherein the spherically-shaped silica is a precipitated silica powder.

2. The spherically-shaped precipitated silica of claim 1, wherein the spherically-shaped silica comprises an average tamped density of greater than 150 g/l.

3. The spherically-shaped precipitated silica of claim 1, wherein the spherically-shaped silica comprises an average tamped density of greater than 250 g/l.

4. The spherically-shaped precipitated silica of claim 1, wherein the spherically-shaped silica comprises a BET surface area of 80 to 600 m$^2$/g.

5. The spherically-shaped precipitated silica of claim 1, wherein the spherically-shaped silica comprises a CTAB surface area of 80 to 500 m$^2$/g.

6. The spherically-shaped precipitated silica of claim 1, wherein the spherically-shaped silica comprises a $d_{10}$ particle size selected within a range of greater than 3 μm and up to 40 μm.

7. The spherically-shaped precipitated silica of claim 1, wherein the spherically-shaped silica comprises a $d_{90}$ particle size selected within a range of greater than 40 μm and up to 90 μm.

8. The spherically-shaped precipitated silica of claim 1, wherein at least 90 weight % of a sample of the spherically-shaped silica passes through a 200-mesh sieve.

9. The spherically-shaped precipitated silica of claim 1, wherein the spherically-shaped silica comprises a bulk density selected within a range of at least 5 lb/ft$^3$ and up to 30 lb/ft$^3$.

10. The spherically-shaped precipitated silica of claim 1, wherein the spherically-shaped silica has an average circularity selected within a range of from 0.70 to 0.95.

11. A process of preparing spherically-shaped precipitated silica powder comprising:
   a) preparing a first alkali metal silicate aqueous solution;
   b) preparing a second alkali metal silicate aqueous solution having a pH of greater than 7 with the first alkali metal silica aqueous solution and water;
   c) simultaneously adding the first alkali metal silicate aqueous solution and an acidifying agent to the second aqueous alkali metal silicate aqueous solution to form a silica suspension comprising precipitated silica;
   d) aging the silica suspension at a pH within a range of from 7 to 14; and
   e) washing and drying the precipitated silica,
   wherein the total time for steps c) and d) is less than 150 minutes, and
   wherein the second alkali metal silicate aqueous solution has an alkalinity AZ value selected within a range of from 1 to 40.

12. The process of claim 11, further comprising adding an additional acidifying agent after the aging such that the pH of the suspension is less than 7.

13. The process of claim 11, wherein the drying of the precipitated silica comprises dispersing the silica in an aqueous medium and spray drying the dispersed silica.

14. The process of claim 13, wherein the precipitated silica is dispersed in the aqueous medium to form a solution with a solids content of less than 20%.

15. The process of claim 11, wherein at least one of steps a) through d) are performed at a temperature selected within a range of from 100° F. to 220° F.

16. The process of claim 11, wherein the first alkali metal silicate aqueous solution and the acidifying agent are simultaneously added in step c) over a time period within a range from 2 to 90 minutes.

17. The process of claim 11, wherein the silica suspension is aged in step d) for a period of time selected within a range from 1 minute to 120 minutes.

18. The process of claim 11, wherein at least one of the first and second alkali metal silicate aqueous solutions is represented by $x(SiO_2)Na_2O$, wherein x is a value selected within a range of from 1 to 4.

19. The process of claim 18, wherein the first alkali metal silicate aqueous solution has a concentration of less than 85 g/L $Na_2O$.

20. The process of claim 11, wherein an alkalinity AZ value of the second alkali metal silicate aqueous solution decreases during the simultaneous addition step c).

21. The process of claim 11, wherein an alkalinity AZ value of the second alkali metal silicate aqueous solution is maintained during the simultaneous addition step c).

22. The process of claim 11, wherein the spherically-shaped precipitated silica is formed in the absence of additional mechanical grinding or milling.

23. The process of claim 11, wherein the first alkali metal silicate aqueous solution and the acidifying agent are simultaneously added once in a single step.

24. A composition comprising the spherically-shaped silica of claim 1.

25. The composition of claim 24, wherein the composition is a rubber composition.

26. The composition of claim 24, wherein the composition is a coating composition.

27. The composition of claim 24, wherein the composition is a porous polymer membrane composition.

28. The composition of claim 24, wherein the composition is a carrier or adsorbent composition.

* * * * *